United States Patent
Snider et al.

(10) Patent No.: US 10,118,985 B2
(45) Date of Patent: Nov. 6, 2018

(54) OPEN CELL SPRAY FIRE-RETARDANT FOAM

(71) Applicant: JOHNS MANVILLE, Denver, CO (US)

(72) Inventors: Scott Snider, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 14/661,737

(22) Filed: Mar. 18, 2015

(65) Prior Publication Data

US 2016/0272772 A1 Sep. 22, 2016

(51) Int. Cl.
| | |
|---|---|
| C08J 9/00 | (2006.01) |
| E04B 1/76 | (2006.01) |
| C08G 18/48 | (2006.01) |
| C08G 18/66 | (2006.01) |
| C08G 18/76 | (2006.01) |
| C08G 18/78 | (2006.01) |
| C08J 9/04 | (2006.01) |
| C08G 18/18 | (2006.01) |
| C08G 18/32 | (2006.01) |
| C08G 18/40 | (2006.01) |
| C08G 101/00 | (2006.01) |

(52) U.S. Cl.
CPC ......... *C08G 18/4837* (2013.01); *C08G 18/18* (2013.01); *C08G 18/3218* (2013.01); *C08G 18/40* (2013.01); *C08G 18/6611* (2013.01); *C08G 18/7621* (2013.01); *C08G 18/7664* (2013.01); *C08G 18/7671* (2013.01); *C08G 18/7837* (2013.01); *C08J 9/04* (2013.01); *C08G 2101/005* (2013.01); *C08G 2101/0083* (2013.01); *C08G 2105/02* (2013.01); *C08J 2205/05* (2013.01); *C08J 2207/04* (2013.01); *C08J 2375/04* (2013.01); *C08L 2201/02* (2013.01); *E04B 1/7604* (2013.01)

(58) Field of Classification Search
CPC ........ C08G 2101/00; C08G 2101/0041; C08G 2101/0083
See application file for complete search history.

(56) References Cited

U.S. PATENT DOCUMENTS

| | | | | |
|---|---|---|---|---|
| 3,281,379 A | * | 10/1966 | Fontaine ................ | C08G 18/14 521/114 |
| 2004/0157945 A1 | | 8/2004 | Barber | |
| 2004/0176494 A1 | * | 9/2004 | Feske ................. | C08G 18/4213 521/161 |
| 2012/0202903 A1 | | 8/2012 | Andrew et al. | |
| 2013/0030067 A1 | * | 1/2013 | Mooney ............. | C08G 18/5021 521/107 |

\* cited by examiner

*Primary Examiner* — Shuangyi Abu Ali
(74) *Attorney, Agent, or Firm* — Robert D. Touslee

(57) ABSTRACT

Embodiments of the present technology may include an open cell spray polyurethane foam. The foam may include a polymer. The polymer may formed by the polymerization of a reaction product of (1) a saccharide with an epoxide and (2) an isocyanate. The reaction product may have greater than 25 weight percent and less than 99 weight percent of the saccharide. The foam may exhibit a fire retardancy sufficient to pass flame tests in accordance with Appendix X and/or ASTM E-4.

20 Claims, 3 Drawing Sheets

OPEN CELL SPRAY FIRE-RETARDANT FOAM

BACKGROUND

Spray foams are widely used as building insulation materials due to their excellent thermal insulation, fire resistance, and mechanical properties. The foams are commonly grouped as either "open cell" foams or "closed cell" foams depending on whether the cells in the foam are completely closed. Spray polyurethane foams (SPFs) made from polyurethane (PUR) may be used in both open cell and closed cell foams, while spray isocyanurate foams are made from polyisocyanurate (PIR), which may normally be used to make dense closed cell foams.

Spray foam insulation is often formed as the polymerizing reactants are being sprayed directly into the building envelope to be insulated, usually with the help of a blowing agent. Modern building codes require spray foams to pass fire tests such as the well-known ASTM E-84 test or the Appendix X test. These tests put strict limits on such characteristics as the flame spread and smoke development characteristics of a spray foam when the spray foam is exposed to fire. Passage of these tests is important for enabling widespread commercial use of a spray foam product. However, these tests are stringent, and fire retardants may be added to the foam formulation to improve the fire performance of a foam, or other measures may be taken to improve the fire retardancy of a foam. For example, intumescent coatings may be applied to SPFs, adding cost and complexity to the installation process. Embodiments of the present technology address shortcomings and inefficiencies of conventional spray foams and methods of making or using spray foams.

BRIEF SUMMARY

Embodiments of the present technology produce an open cell spray foam that can pass stringent fire retardancy tests, such as Appendix X and/or ASTM E-84. The open cell spray foams may include a polyurethane or a polyisocyanurate formed with a saccharide with low alkoxylation. The saccharide may provide fire retardant properties to the spray foam. In addition, because the saccharide may be polymerized into polyurethane or polyisocyanurate, the spray foam may be water resistant. For example, if the spray foam gets wet, the water may not wash away an otherwise water soluble saccharide.

Embodiments of the present technology may include an open cell spray polyurethane foam. The foam may include a polymer. The polymer may formed by the polymerization of a reaction product of (1) a saccharide with an epoxide and (2) an isocyanate. The reaction product may have greater than 25 weight percent and less than 99 weight percent of the saccharide. The foam may exhibit a fire retardancy sufficient to pass flame tests in accordance with Appendix X and/or ASTM E-4.

These and other embodiments may include a formulation for forming an open cell spray foam. The formulation may include between 16% and 61% by weight of a reaction product. The reaction product may be from the reaction of a saccharide with an epoxide. The saccharide may be between 25 wt. % and 99 wt. % of the reaction product. A spray foam made from the spray foam formulation may exhibit a fire retardancy sufficient to pass flame tests in accordance with Appendix X and/or ASTM E-84.

Embodiments of the present technology may also include an insulated structure. The insulated structure may include a plurality of structural support members coupled together to form a frame. The structure may also include a plurality of wall boards attached to an exterior side of the frame to form an exterior wall or surface of the structure. The plurality of structural support members and the plurality of wall boards may define a wall cavity. The structure may also include a spray foam insulation positioned within the wall cavity of the structure. The spray foam insulation may be made from a formulation that includes a polymer. The polymer may be formed from the polymerization of a reaction product of a saccharide with an epoxide and an isocyanate. The reaction product may include greater than 25 wt. % and less than 99 wt. % of the saccharide. The insulation layer may exhibit a fire retardancy sufficient to pass flame tests in accordance with Appendix X and/or ASTM E-84.

Embodiments of the present technology may further include a method of insulating a component of a building. The method may include coupling a plurality of structural support members together to form a frame. The method may also include attaching a plurality of first wall boards to an exterior side of the frame to form an exterior wall or surface of the structure. The method may further include attaching a plurality of second wall boards to an interior side of the frame to form an interior wall or surface of the structure. The structural support members, the first wall boards, and the second wall boards may define a plurality of wall cavities. Additionally, the method may include positioning a spray insulation material within at least one of the wall cavities to insulate an interior space of the structure. The spray insulation material may include a spray foam made from a spray foam formulation. The spray foam formulation may include a polymer formed by a polymerization of (1) a reaction product of a saccharide with an epoxide, where greater than 25 wt. % and less than 99 wt. % of the reaction product is from the saccharide, and (2) an isocyanate. The spray insulation material may exhibit a fire retardancy sufficient to pass flame tests in accordance with Appendix X and/or ASTM E-84.

DETAILED DESCRIPTION

Figure 1:
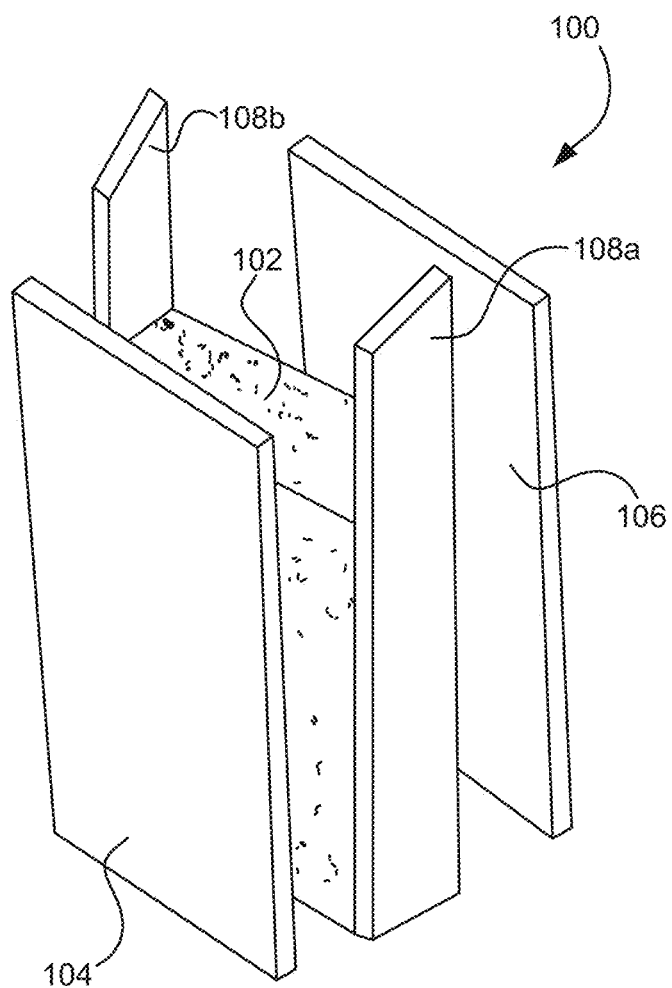
FIG. 1 illustrates an embodiment of a simplified exploded view of a spray foam insulation positioned within a wall cavity.

Many prior spray foams include polyurethane and are known as spray polyurethane foams (SPFs). A typical prior formulation for making SPF may include (i) a polyisocyanate reactant and (ii) a polyol reactant. The SPFs are made by combining separate liquid mixtures that include the polyisocyanates (the A-side mixture) and the polyols (the B-side mixture) and then immediately spraying the combined mixtures through a spray machine directly into a building envelope to be thermally insulated, such as a wall and joist cavity. The spray machine may include a first transfer pump for carrying the A component and a second transfer pump for carrying the B component. The A and B components may be transferred at a prescribed volume ratio (often 1:1) through a heated dual hose into a spray gun, where the components mix together to form the SPF product that is released for administration at the building envelope. In some practices, the SPF product may be stored in and administered from a smaller, portable can that maintains the A-side and B-side mixtures in two separate drums or containers until ready to combine and dispense. In other practices, the SPF liquids can be stored as a pre-combined and partially-reacted blend.

The A-side mixture of the SPF may include one or more polyisocyanate compounds. Exemplary polyisocyanates may include substituted or unsubstituted polyisocyanates, and may more specifically include aromatic, aliphatic, and cycloaliphatic polyisocyanates having at least two isocyanate functional groups. Specific exemplary aromatic polyisocyanates include 4,4'-diphenylmethane diisocyanate (MDI), polymeric MDI (PMDI), toluene disisocyanate, and allophanate modified isocyanate. A commercial example of a PMDI that may be used in the present formulations is Rubinate® M manufactured by Huntsman Polyurethanes of The Woodlands, Tex. This PMDI has a viscosity range of about 200 to about 300 cps at 25° C. (e.g., 190 cps at 25° C.), a functionality range of about 2.3 to about 3.0, and an isocyanate content that ranges from about 28% and about 35% (e.g., 31%).

The formation of polyurethane may require the presence of a sufficient amount of a reactive polyol or polyols to support the reaction that creates polyurethane from the polyisocyante compounds. For example, the B-side mixture of a typical SPF may include one or more polyol compounds. Exemplary polyols may include polyether polyols, polyester polyols, and mannich polyols. Polyether polyols may be made by polymerizing one or more types of epoxides, such as ethylene oxide or propylene oxide. They may also be made by polymerizing the epoxide with a polyol such as a diol (e.g., glycol), triol (e.g., glycerin), or other polyol. Exemplary polyether polyols may include polyether diols such as polyether polyethylene glycol, polypropylene glycol, and poly(tetramethylene ether) glycol, among other polyether diols. Additional exemplary polyether polyols that may be used in the present formulations are sold under the tradename Jeffol® by Huntsman Polyurethanes of The Woodlands, Tex.

Saccharides are a type of polyol but still may not react with isocyanate to form polyurethane. In this specification, saccharides describe compounds that include monosaccharides, disaccharides, oligosaccharides, and polysaccharides. Because saccharide molecules, and in particular sucrose (shown below), include multiple hydroxyl groups, saccharides have been explored as candidates for polyols to be used in SPF formulations.

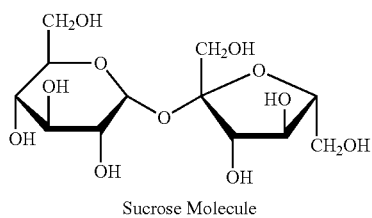

Sucrose Molecule

A saccharide may also be a fire retardant, due to its fast char formation and dehydration when exposed to fire. While saccharides such as sucrose may be effective fire retardants, not all saccharides may be bonded to the spray polyurethane foam in conventional methods. Instead, the saccharides may be a filler in the foam. Foams with saccharides as fillers may have some fire retardant properties. However, if the foam were to get wet, the water may dissolve the saccharides, and the saccharides may subsequently be washed away from the rest of the foam. Table 1 shows the results of water extraction experiments. In the foams tested in Table 1, over 89 percent of the sucrose may be removed with water, indicating that a significant amount of sucrose does not react to form polyurethane in the foam. If moisture from water or humidity extracts saccharides from the foam, the foam may lose some of the fire retardant properties associated with the saccharides.

TABLE 1

Extractable Free Sugar in Sucrose Based Open Cell Foams

| Sample Name | Sucrose in B-side Formulation (parts) | Free Sucrose as percent in the formulation (%) |
| --- | --- | --- |
| SS-1 | 30 | 91 |
| SS-2 | 20 | 82 |
| SS-3 | 15 | 92 |
| SS-4 | 10 | 89 |

Saccharides may not bond readily to an isocyanate for different reasons. The isocyanate may be expected to react with a hydroxyl group on the saccharide. Sucrose, for instance, has eight hydroxyl groups. However, with sucrose, five of the eight hydroxyl groups are bonded to a secondary carbon and may not be as reactive as hydroxyls bonded to primary carbons. And while sucrose may have three hydroxyls bonded to primary carbons, even these three hydroxyls may be sterically hindered, which may decrease the reactivity of the hydroxyls with the isocyanate.

In order to improve the reactivity of the hydroxyls, the saccharide may be reacted with an epoxide to produce a hydroxyl group bonded to a primary carbon with less steric hindrance. Examples of such epoxides include ethylene oxide and propylene oxide. An epoxide may add a chain of carbon and oxygen between a hydroxyl and the rings of a saccharide, and the additional chain may make the hydroxyl more reactive to the isocyanate. But by adding longer chains of carbon and oxygen, the molecule may become less similar to the saccharide and may become more similar to the epoxide. Longer chains increase the likelihood that the molecule and the resulting foam formed with the molecule may burn rather than char. For instance, an alkoxylated sucrose with 25% of its weight from sucrose and 75% of its weight from epoxides incorporated into a polyurethane foam may not pass the Appendix X test. In contrast, a spray foam with a 100% sucrose filler may pass the Appendix X test. Thus, a spray polyurethane foam with a polyurethane formed with an alkoxylated saccharide with greater than 25% of its weight from the saccharide may pass the Appendix X test.

Embodiments of the present technology may include an open cell spray polyurethane foam. The foam may include a polymer. The polymer may be formed by the polymerization of a reaction product of a saccharide with an epoxide and an isocyanate.

The saccharide may be a reducing sugar or a non-reducing sugar. The saccharide may include a sucrose, a sugar with a dextrose equivalent of under 20, a sugar with a dextrose equivalent under 2, or a sugar with a dextrose equivalent of 0 in embodiments. The saccharide may include starch, modified starch, or starch degradation products. Saccharides may include pectin, dextrin, maltodextrin, corn syrup, molasses, poly(n-alkyl glucosides), sugar alcohols such as sorbitol, or mixtures thereof.

The epoxide may include ethylene oxide (EO), propylene oxide (PO), or a mixture thereof. The propylene oxide may be less reactive with the isocyanate. The epoxide mixture may include greater number of moles or a greater mass of ethylene oxide than propylene oxide. The epoxide may exclude propylene oxide.

The reaction product may have greater than 25 wt. % and less than 99 wt. % of the saccharide. The upper weight percent limit of the saccharide in the reaction product may be from a single ethylene oxide molecule reacting with a hydroxyl group of the saccharide. In the case of sucrose, the upper weight percent limit may be 89 wt. %, when one molecule of ethylene oxide reacts with a hydroxyl group of sucrose. Other weight percent ranges of the saccharide in the reaction product may be between 30 wt. % and 89 wt. %, between 40 wt. % and 89 wt. %, between 50 wt. % and 89 wt. %, between 60 wt. % and 89 wt. %, between 30 wt. % and 80 wt. %, between 40 wt. % and 70 wt. %, and between 50 wt. % and 60 wt. %. Based on the molecular weights of ethylene oxide and propylene oxide and finite though numerous combinations resulting in a weight percent of saccharide over 25 wt. %, specific weight percentage ranges of the saccharide in the reaction product are known but not all listed here for clarity.

The reaction product, for example, may include a molecular formula of the following:

One or more of the hydroxyl groups of the saccharide may react with the epoxide. In embodiments, two of the hydroxyl groups may react with epoxides. For example, two of the hydroxyl groups of sucrose may each react with an epoxide. In other embodiments, three of the hydroxyl groups may react with the epoxide. The hydroxyl groups of the saccharide that react with epoxides may be hydroxyl groups bonded to a primary carbon. One hydroxyl group that reacts may be a hydroxyl group bonded to a primary carbon bonded to a carbon in the five-member ring of sucrose, with the carbon in the five-member ring adjacent to the oxygen atom bridging the two rings. For example, in the example formula above, the a and b groups are bonded to this described hydroxyl group.

Possibly as a result of the chair structure of the six-member ring and the hydrogen bonding in solution, a hydroxyl group that reacts may be a hydroxyl group bonded to a secondary carbon. One hydroxyl group that reacts may be the hydroxyl group of the six-member ring that is bonded to a secondary carbon, which is bonded to a carbon that is directly bonded to the bridging oxygen atom. In the example formula, the c and d groups are bonded to that hydroxyl group. Additionally, another hydroxyl group that reacts may be the hydroxyl group bonded to a secondary carbon of the five-member ring of sucrose, with the secondary carbon directly bonded to a carbon that is directly bonded to the bridging oxygen atom. The reaction product may include a hydroxyl group bonded to a primary carbon, and the hydroxyl group may include an oxygen atom from the epoxide.

The foam may exhibit a fire retardancy sufficient to pass flame tests in accordance with Appendix X and/or ASTM

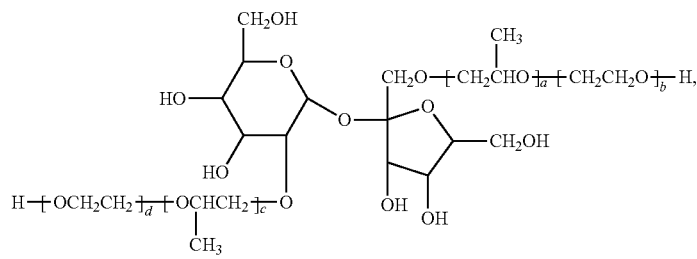

where a denotes an integer number of propylene oxide groups that react at a hydroxyl site on the five-membered ring of sucrose, b denotes an integer number of ethylene oxide groups that react off the same hydroxyl site as the a PO units, c denotes an integer number of PO groups that react at a hydroxyl site on the six-membered ring of sucrose, and d denotes an integer number of EO groups that react off the same hydroxyl site as the c PO units. The sum of a, b, c, and d may be from 1 to 23.

In embodiments, the reaction product may reverse the order of the EO and PO groups off the same hydroxyl site. For instance, the saccharide may be directly bonded to the EO groups, which are then in turn bonded to PO groups rather than what is depicted in the example formula above. In other embodiments, the EO and PO groups may be random. For example, off one hydroxyl site, the oxygen may be directly bonded to an EO group or groups, which may then be bonded to a PO group or groups, which may then be bonded to an EO group or groups, and so on. In these and other examples, a first integer number of EO groups may be followed by a second integer number of PO groups, which may then be followed by a third integer number of EO groups and so on. The integer numbers may be any number from 1 to 12. The pattern of EO and PO off one hydroxyl site may not be the pattern on another hydroxyl site.

E-4. The foam may have a density between about 0.3 and about 0.5 pcf. The foam may exclude free sucrose, greater than 5 wt. % free sucrose (based on the amount of sucrose supplied for reaction with the isocyanate), or greater than 10 wt. % free sucrose in embodiments. Free sucrose may be any sucrose not reacted with an epoxide. The foam may have an insulative R value of 3.0 to 5.0 per inch.

These and other embodiments may include a formulation for forming an open cell spray foam. The formulation may include between 16% and 61% by weight of a reaction product. The formulation may be the B-side formulation and may not include the A-side. The reaction product may be from the reaction of a saccharide with an epoxide. The saccharide may be between 25 wt. % and 99 wt. % of the reaction product. A spray foam made from the spray foam formulation exhibit a fire retardancy sufficient to pass flame tests in accordance with Appendix X and/or ASTM E-84.

The formulation may include a fire retardant that is not formed from the saccharide. This fire retardant included in a spray foam formulation according to embodiments may be of any suitable type, for example a non-halogentated fire retardant or a halogentated fire retardant. The fire retardant may be reactive (containing isocyanate reactive functionality) or the second fire retardant may be non-reactive.

Exemplary non-halogenated fire retardants may include organo-phosphate compounds, organo-phosphite compounds, and organo-phosphonate compounds. The organo-phosphate compounds can have the general formula:

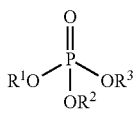

Organo-Phosphate Compounds where $R^1$, $R^2$ and $R^3$ are independently an alkyl group, an olefin group, a hydroxy alkyl group, or an aromatic group. Exemplary organo-phosphate compounds include butyl diphenyl phosphate, dibutyl phenyl phosphate, triphenyl phosphate, and triethyl phosphate (TEP), among other organo-phosphate compounds.

The organo-phosphite compounds can have the general formula:

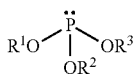

Organo-Phosphite Compounds where $R^1$, $R^2$ and $R^3$ are independently an alkyl group, an olefin group, a hydroxy alkyl group, or an aromatic group. Exemplary organo-phosphite compounds include tris(2,4-di-t-butylphenyl)phosphite.

The organo-phosphonate compounds can have the general formula:

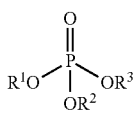

Organo-Phosphonate Compounds where $R^1$, $R^2$ and $R^3$ are independently an alkyl group, an olefin group, a hydroxy alkyl group, or an aromatic group. Exemplary organo-phosphonate compounds include diethyl hydroxylmethyl phosphonate (DEHMP), dialkyl hydroxyalkanephosphonate (e.g., dimethyl hydroxymethylphosphonate), and diaryl hydroxyalkanephosphonate (e.g., diphenyl hydroxymethylphosphonate) among other organo-phosphonate compounds.

Exemplary spray foam formulations may include the use of one or more of the above classes of phosphorous-containing, non-halogenated fire retardants. For example, the spray foam formulation may include an organo-phosphate compound, an organo-phosphite compound, or an organo-phosphonate compound. Additional examples include a combination of an organo-phosphate compound and organo-phosphite compound, a combination of an organo-phosphate compound and organo-phosphonate compound, or a combination of an organo-phosphite compound and organo-phosphonate compound. Further examples include combinations of an organo-phosphate compound, an organo-phosphite compound, and an organo-phosphonate compound.

In other embodiments, example spray foam formulations may include one or more halogenated fire retardants, for example tris(1-chloro-2-propyl)phosphate (TCPP), brominated diol, brominated triol, chlorinated phosphate, other halogenated fire retardants, or combinations thereof. In still other embodiments, a combination of halogenated and non-halogenated fire retardants may be used, in addition to the sugar.

The formulation may also include 0% to 30% by weight of a polyol not involved in forming the reaction product, 9% to 36% by weight TCPP, 2% to 16% by weight amine catalyst, 3% to 22% by weight emulsifier (e.g., NP-9), 0.3% to 4% by weight surfactant, and 9% to 36% by weight water.

An amine catalyst may include a tertiary amine, treiethylenediamine (TEDA), N-methylimidazole, 1,2-dimethylimidazole, N-methylmorpholine, N-ethylmorpholine, triethylamine, N,N'-dimethyl-piperazine, 1,3,5-tris (dimethylaminopropyl)hexahydrotriazine, 2,4,6-tris(dimethylamino-methyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylamino-cyclohexylamine, pentamethyldipropylentriamine, triethanolamine, dimethylethanolamine, bis(dimethylaminoethyl)ether, tris(3-dimethylamino)propylamine, 1,8-diazabicyclo[5.4.0]undecene, bis(N,N-dimethylaminopropyl)-N'-methyl amine and their acid blocked derivatives, and mixtures thereof.

Emulsifiers may include nonylphenolethoxylates (NPEs), oxyethylated fatty alkyl phenols (NPEs), oxyethylated fatty alcohols (alkylethoxylated alcohols), foam stabilizing agents such as silicone polyethers, among other conventional additives and agents. Amine catalysts and emulsifiers are described in U.S. Patent Publication No. 2012/0202903, which is incorporated herein by reference for all purposes.

Surfactants may reduce surface tension during foaming and may affect the cell structure of the foam. Surfactants may include a silicone surfactant, an organic surfactant, a silicone polyether copolymer, silicone-polyoxyalkylene block copolymers, nonionic polyoxyalkylene glycols and their derivatives, ionic organic salts, ether sulfates, fatty alcohol sulfates, sarcosinates, amine oxides, sulfonates, amides, sulf-succinates, sulfonic acids, alkanol amides, ethoxylated fatty alcohol, and nonionics such as polyalkoxylated sorbitan. Example surfactants may include polydimethylsiloxane-polyoxyalkylene block copolymers. Other surfactants are described in European Patent Application No. EP1578832, which is incorporated herein by reference for all purposes.

Table 2 shows open cell spray foam formulations according to these and other embodiments. The sum of all parts may or may not equal to 100. Table 2 may describe formulations only in the B-side.

TABLE 2

| Open cell spray foam formulation that passes E-84 and Appendix X | |
|---|---|
| | Parts |
| Sucrose polyol (low alkoxylation) | 20-60 |
| Other polyol | 0-25 |
| TCPP | 15-25 |
| Amine catalyst | 4-10 |
| Emulsifier | 5-15 |
| Surfactant | 0.5-2 |
| Water | 15-25 |

Embodiments of the present technology may also include a spray polyisocyanurate foam or a formulation for a polyisocyanurate foam. Polyisocyanurate synthesis may be similar to polyurethane synthesis. With forming polyisocyanurate, the proportion of isocyanate may be higher than with the synthesis of polyurethane. The isocyanate proportion in the foams reacting with the saccharide may be modified to form polyisocyanurate instead of polyurethane.

Embodiments of the present technology may also include an insulated structure. The insulated structure may include a plurality of structural support members coupled together to form a frame. The structure may also include a plurality of first wall boards attached to an exterior side of the frame to form an exterior wall or surface of the structure. The plurality of structural support members and the plurality of first wall boards may define a wall cavity. The structure may also include a spray foam insulation positioned within the wall cavity of the structure. The spray foam insulation may be made from a formulation that includes a polymer. The polymer may be formed from the polymerization of a reaction product of a saccharide with an epoxide and an isocyanate. The reaction product may include greater than 25 wt. % and less than 99 wt. % of the saccharide. The insulation layer may exhibit a fire retardancy sufficient to pass flame tests in accordance with Appendix X and/or ASTM E-84. The spray foam formulation and the spray foam insulation may be any formulation or insulation described herein.

These and other embodiments of the present technology may include a method of insulating a component of a building. The method may include coupling a plurality of structural support members together to form a frame. The method may also include attaching a plurality of first wall boards to an exterior side of the frame to form an exterior wall or surface of the structure. The method may further include attaching a plurality of second wall boards to an interior side of the frame to form an interior wall or surface of the structure, where the structural support members, the first wall boards, and the second wall boards define a plurality of wall cavities. Additionally, the method may include positioning a spray insulation material within a wall cavity of the structure to insulate an interior space of the structure, where the spray insulation material includes a spray foam made from any spray foam formulation described herein. The insulation layer may exhibit a fire retardancy sufficient to pass flame tests in accordance with Appendix X and/or ASTM-E-84.

Referring now to FIG. 1, an insulation system 100 is shown with spray foam insulation 102 positioned between a first wall board 104 and second wall board 106 attached to structural support members 108. The spray foam insulation 102 may include open cell foam insulation, closed cell foam insulation, or a combination of both open and closed cell foam insulation.

Open cell foam insulations embodying the invention may be characterized by a lower density in a range from about 0.3-1.8 pcf or pounds per cubic foot, while closed cell foam insulations embodying the invention include intermediate to higher density at a range from about 1.75-8.0 pcf. For example, open cell foam insulation may have a density from about 0.3-0.7 pcf (e.g., about 0.5 pcf), and closed cell foam insulation may have a density from about 1.8-4.0 pcf.

Both open and closed cell foam insulations have high insulation value, or R-value, and thus offer high resistance to heat flow. The selection of open or closed cell foam insulation may be based on several factors, including, for example, insulating power, air and moisture permeability, strength, rigidity, water resistance, density, acoustic absorption levels, and the like.

Still referring to FIG. 1, the spray foam insulation 102 is fire resistant and passes the ASTM E-84 and/or Appendix X fire tests, due in part to the presence of a saccharide that acts as a fire retardant and that may be alkoxylated and polymerized with an isocyanate. The ASTM E-84 tunnel test is a common fire test that is required for plastic foam insulation used in either wall or roof insulation systems. The test requires measuring the flame spread and smoke density that is generated by the foam core in response to exposure to a flame. Most polyurethane spray foams can only pass this test by using halogenated fire retardants. The halogenated fire retardants enable the insulation to pass this test due to the fire retardants' dual function of gas phase radical scavenging and char formation in the solid phase.

Appendix X is a common fire test for spray foam insulation. The test procedure is a modified NFPA 286, "Standard Methods of Fire Tests for Evaluating Contribution of Wall and Ceiling Interior Finish to Room Fire Growth," method. A passing test is when the time for attainment of the four measured test parameters is 4 minutes 18 seconds or greater. The four parameters are the time at which flames exit the doorway, the Heat Release Rate exceeds 1 MW, the heat flux to the floor exceeds 20 $kW/m^2$, and the average upper layer temperature exceeds 600° C. Most spray foams can only pass this test by covering the spray foam layer with an intumescent coating, which incurs additional costs and labor during installation.

Test results show that the spray foam insulation 102 that include a polyurethane formed with a low alkoxylated saccharide in combination with an additional fire retardant pass the ASTM E-84 and/or Appendix X test in part due to the char formation and dehydration attributable to the saccharide.

Turning back to FIG. 1, the spray foam insulation 102 described herein includes a sugar, the majority of which is present in the spray foam formulation as a precursor to the polyurethane and acts as a fire retardant. The spray foam insulation 102 also includes an additional fire retardant, and passes the ASTM E-84 and/or Appendix X fire tests. For instance, an exemplary open cell spray foam formulation may include any combination of components described herein.

The spray foam insulation 102 shown in FIG. 1 is functioning as insulation material for a wall system. The spray foam insulation 102 typically have insulative R-values of 3.0 to 4.5 per inch for open cell foams and insulative R-values of 5.8 to 7.0 per inch for closed-cell foams.

Exemplary Wall Systems

Wall structures or systems of commercial and residential structures are commonly insulated by filling a wall cavity that is positioned between wall studs (wood or metal). The wall cavity may be filled using a spray foam insulation (open cell and/or closed cell, such as the spray foam insulation 102) or in combination with a Batt or roll insulation (e.g., fiberglass, mineral wool, cotton, and the like), loose fill insulation (e.g., fiberglass, cellulose, mineral wool, and the like). Thermal bridging from the wall studs can reduce the effectiveness of the cavity insulation. To reduce the effects of thermal bridging, the wall system or structure may include external sheathing insulation (e.g., continuous external sheathing), such as with a foil faced rigid foam board, that is coupled with the cavity insulation.

Figure 2:
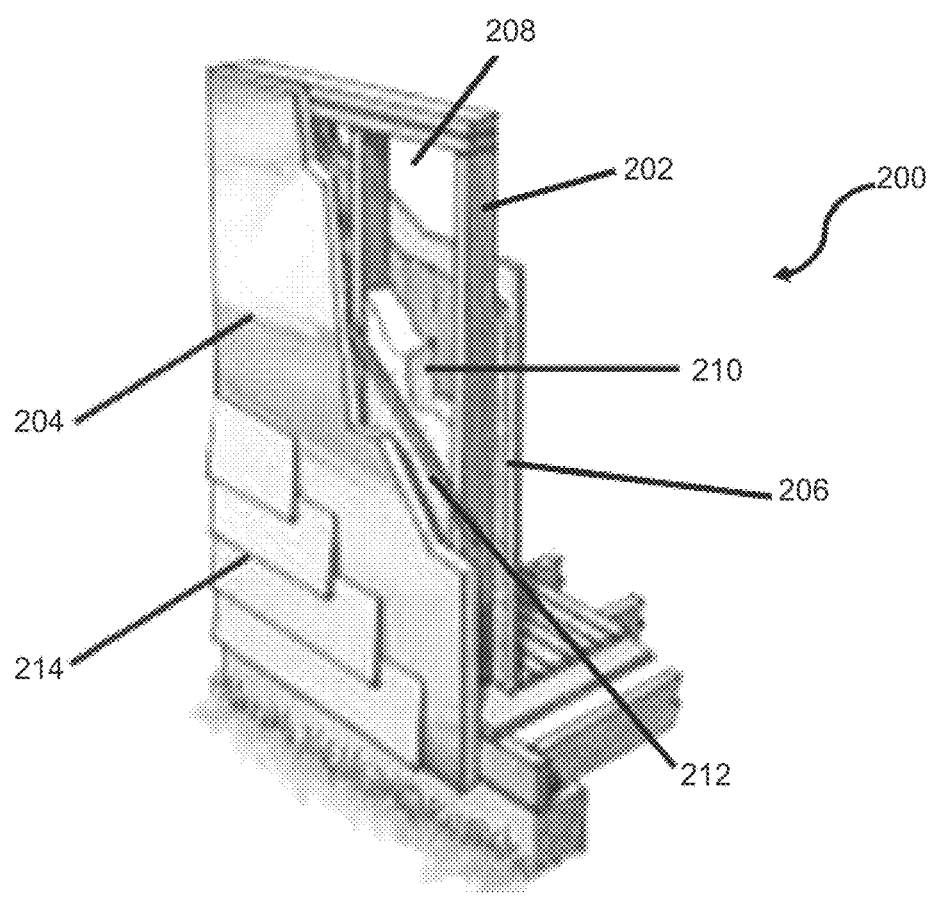
FIG. 2 illustrates an embodiment of a commercial or residential wall system or structure that includes a spray foam insulation positioned inside a wall cavity.

Referring now to FIG. 2, illustrated is an embodiment of a wall system or structure 200 that may be used to insulate a commercial or residential structure. Wall system 200 includes a plurality of structural support members or wall studs 202 that are coupled together to form a wall frame. A plurality of foam boards, particle boards, and/or plywood boards 204 (hereinafter sheathing boards 204) are attached to an exterior side of the frame to form an insulative exterior wall or surface of the wall system 200 (i.e., continuous external sheathing insulation). A plurality of wall boards 206 are attached to an interior side of the frame opposite the sheathing boards 204 to form an interior wall or surface of the wall system 200. Exemplary wall boards 206 include gypsum boards and the like. The wall studs 202, sheathing boards 204, and wall boards 206 define a plurality of wall cavities 208.

Fasteners (not shown) are used to attach the sheathing boards 204 and wall boards 206 to the respective sides of the frame. Each fastener may include an elongate shaft that penetrates through a respective board and into a wall stud 202 to couple the components together. Exemplary fasteners include nails and screws, although in some embodiments non-mechanical fasteners may be used, such as adhesives and the like. Spray foam insulation 210 is positioned within a wall cavity 208 of the wall system, and more commonly within each wall cavity 208 or within most of the wall cavities. The spray foam insulation 210 is positioned within the wall cavity 208 to insulate the building or structure.

In some embodiments, an additional wall board 212 may be attached to the exterior side of the frame. Wall board 212 may be positioned between the sheathing board 202 and frame or wall studs 202 for structural support and/or other purposes. External veneer or cladding 214 (hereinafter exterior cladding 214) may be positioned on an exterior side of the sheathing boards 204. The wall system 200 may also include other components, layers, and/or materials that are not shown, such as an interior vapor barrier, flashing, primer, and the like.

Figure 3:
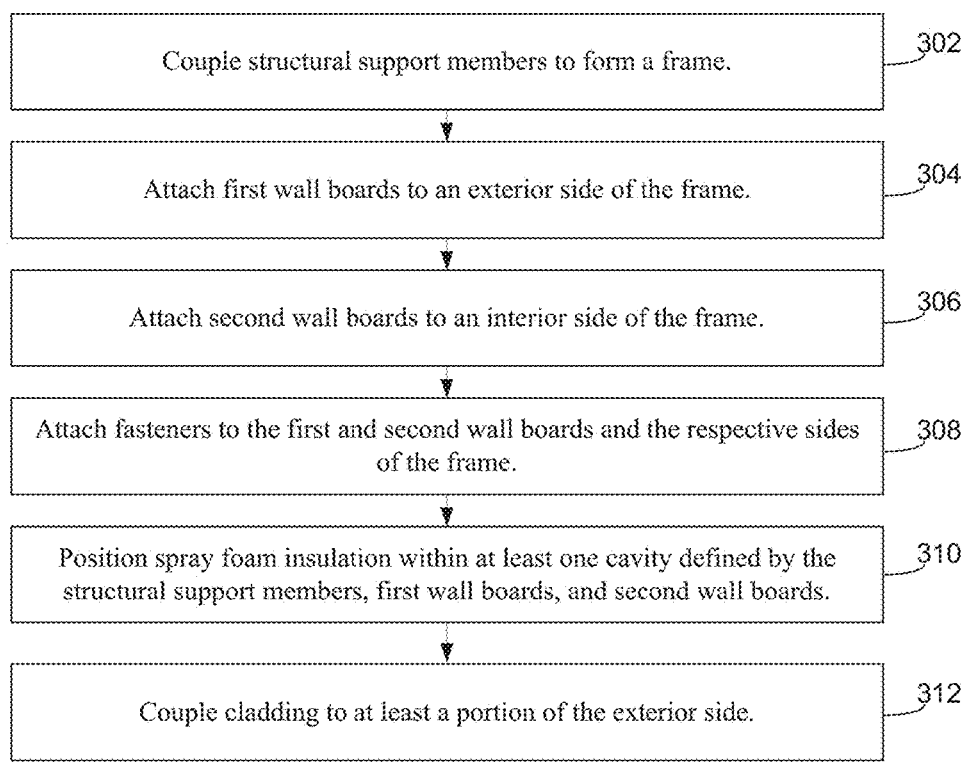
FIG. 3 illustrates a method for insulating a component of a building with the present spray foam insulation.

Turning now to FIG. 3, an insulation method 300 for insulating a component of a building with spray foam insulation is provided. The method 300 may include coupling 302 a plurality of structural support members together to form a frame. The structural support members may include wall studs as shown in FIG. 2. The method 300 may further include the step of attaching 304 a plurality of first wall boards, such as foam boards or sheathing boards, to an exterior side of the frame to form an exterior wall or surface of the structure. Further, the method 300 may include attaching 306 a plurality of second wall boards to an interior side of the frame to form an interior wall or surface of the structure. In this way, the method 300 provides for a plurality of wall cavities defined by the structural support members, the first wall boards, and the second wall boards. In some embodiments, the method further includes the step of attaching 308 a plurality of fasteners to the first and second wall boards and the respective sides of the frame to secure the building structure. As described previously, each fastener may comprise an elongate shaft that penetrates through a respective wall board and into a respective structural support member to couple the components together. Such fasteners may include nails and screws, non-mechanical fasteners, adhesives, and the like.

Still referring to FIG. 3, the method 300 further includes the step of positioning spray foam insulation within a wall cavity of the structure to insulate an interior space of the structure 310. The spray foam insulation is made from the present primarily polyurethane spray foam formulations described above. Exemplary methods of positioning the spray foam insulation may include spraying the A-side and B-side components of the formulation into the wall cavity with the aid of a blowing agent. In the case of an open-cell spray foam insulation, the blowing agent may be water or an aqueous solution. In the case of a closed-cell spray foam insulation, the blowing agent may be a fluorocarbon gas (e.g., 245-fa, 365-mfc, HFO 1233zd) and/or a non-halogenated hydrocarbon (e.g., pentane).

In another aspect, the method 300 further includes the steps of coupling 312 cladding to at least a portion of the exterior wall. Fiberglass material may also be optionally positioned within a wall cavity.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the saccharide" includes reference to one or more saccharides and equivalents thereof known to those skilled in the art, and so forth. The invention has now been described in detail for the purposes of clarity and understanding. However, it will be appreciated that certain changes and modifications may be practice within the scope of the appended claims.

What is claimed is:

1. An open cell spray polyurethane foam, the foam comprising a polyurethane formed by a polymerization of:
    a polyether polyol consisting of a product formed by a reaction of reactants consisting of a saccharide with an epoxide, wherein greater than 25 wt. % and less than 99 wt. % of the polyether polyol is from the saccharide; and
    an isocyanate, wherein:
       the saccharide is sucrose, and
       the foam excludes greater than 10 wt. % free sucrose.

2. The foam of claim 1, wherein the foam exhibits a fire retardancy sufficient to pass flame tests in accordance with at least one of Appendix X and ASTM E-84.

3. The foam of claim 1, wherein the epoxide comprises ethylene oxide, propylene oxide, or a mixture thereof.

4. The foam of claim 1, wherein the foam further comprises a flame retardant that does not include a product formed from the saccharide.

5. The foam of claim 1, wherein greater than 30 wt. % and less than 89 wt. % of the polyether polyol is from the saccharide.

6. The foam of claim 1, wherein greater than 40 wt. % and less than 89 wt. % of the polyether polyol is from the saccharide.

7. The foam of claim 1, wherein greater than 50 wt. % and less than 89 wt. % of the polyether polyol is from the saccharide.

8. The foam of claim 1, wherein the polyether polyol comprises a molecular formula of:

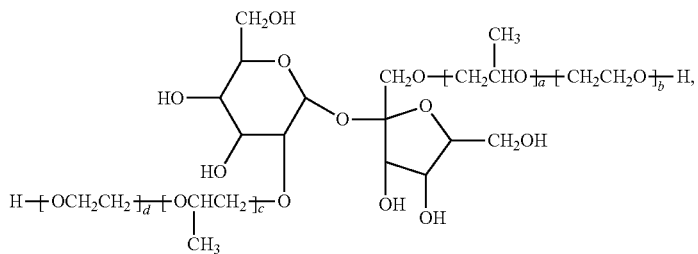

wherein:
a, b, c, and d are non-negative integers, and
a+b+c+d is from 1 to 23.

9. The foam of claim 1, wherein two hydroxyl groups of the sucrose react with the epoxide.

10. The foam of claim 1, wherein the epoxide comprises ethylene oxide, propylene oxide, or a mixture thereof.

11. The foam of claim 1, wherein the foam has a density of between about 0.3 pcf and 0.7 pcf.

12. The foam of claim 1, wherein the foam excludes free sucrose.

13. The foam of claim 1, wherein the epoxide comprises a mixture with more ethylene oxide than propylene oxide.

14. The foam of claim 1, wherein the polyether polyol comprises a hydroxyl group bonded to a primary carbon, and the hydroxyl group comprises an oxygen atom from the epoxide.

15. The foam of claim 1, wherein the epoxide comprises a mixture of ethylene oxide and propylene oxide.

16. The foam of claim 15, wherein the polyether polyol comprises two hydroxyl groups of the sucrose reacted with the epoxide.

17. The foam of claim 1, wherein the polyurethane is formed by a polymerization consisting of the polyether polyol and the isocyanate.

18. A formulation for forming an open cell spray foam, the formulation comprising by weight:
16-61% a polyether polyol consisting of a product formed by a reaction of reactants consisting of a saccharide with an epoxide, wherein greater than 25 wt. % and less than 99 wt. % of the polyether polyol is from the saccharide, wherein the formulation excludes greater than 10 wt. % free sucrose.

19. The formulation of claim 18, further comprising:
0-30% polyol;
9-36% TCPP;
2-16% amine catalyst;
3-22% emulsifier;
0.3-4% surfactant; and
9-36% water.

20. The formulation of claim 18, wherein the saccharide is sucrose.

* * * * *